May 31, 1966 W. C. NIELSEN 3,253,623
ADJUSTABLE DADO CUTTER
Filed Dec. 17, 1963

INVENTOR.
WALDEMAR C. NIELSEN
BY Fulwider Patton Rieber
Lee and Utecht
ATTORNEYS United States Patent Office 3,253,623
Patented May 31, 1966

3,253,623
ADJUSTABLE DADO CUTTER
Waldemar C. Nielsen, 1842 W. Washington Blvd.,
Los Angeles, Calif.
Filed Dec. 17, 1963, Ser. No. 331,204
9 Claims. (Cl. 144—238)

The present invention relates generally to rotary wood cutting tools and more particularly to a rotary tool for cutting grooves or dados and having an adjustable mounting on its driving shaft.

In woodworking it is often desirable to cut a slot or groove, known as a dado, in a piece of wood into which another member is to be fitted, or for decoration or other purposes. Such dados or grooves are formed with circular cutters mounted on a power driven shaft. In one form, cutters are made up of a pair of circular saw blades with a number of chippers sandwiched between them. The only way to adjust such a tool to cut grooves of diffeernt widths is to dismantle it, change the number of chippers, and reassemble it.

A form of dado cutter capable of easy adjustment has been developed which is made of a single circular saw blade supported on a split hub, the parts of which are arranged so that one part can be tilted with respect to the axis of the shaft, and to hold the saw blade in a tilted position. The width of the cut is controlled in accordance with the angle at which the blade is tilted.

In the tiltable types of dado cutters heretofore known, the greatest difficulties revolve around efforts to perform both the functions of making a clean cut (i.e., no splintering) and a flat bottom groove. In this connection, a conventional cross-cut saw blade will provide a clean cut, but the absence of chippers prevents its making a flat bottom groove.

An attempt to avoid the disadvantages of the cross-cut saw blade has been to make a blade that is relatively thick, with fewer teeth spaced relatively far apart, and run it at a higher speed. The extra thickness permits the teeth to be shaped to perform the function of chipping. However, such blades do not permit cuts as clean as desired to be made.

In addition to the foregoing, the blade supporting hubs of previously known tiltable dado cutters are undesirably complex arrangements of a number of elements, and are such that they prevent the blade from being adjusted so that the same teeth always do the outside cutting, i.e., for the sides of the groove. A typical example is one in which the blade is sandwiched between a tiltable plate and a vertical plate having a set screw in one portion thereof, with a back-up element bearing against the tiltable plate and a jamb nut bearing against the set screw supporting plate. To change the angle of tilt of the blade in such an arrangement, the jamb nut must be loosened or tightened while the set screw is turned. During such operations, there is nothing to prevent the blade from being rotated about its axis, so that when the blade is fixed in a new position, different teeth do the outside cutting than those which performed this function in the previous setting.

Still further, the various parts of such a cutter are separated from each other when the cutter is stored. It is thus imposible to reassemble these parts at any time with any assurance of duplicating a particular setting or arranging them so that the same teeth do the outside cutting.

It is an object of the present invention to provide an improved mounting and tilt-adjusting means for a rotary dado cutter which overcomes the above and other disadvantages of the prior art.

Another object of this invention is to provide an adjustable dado cutter which insures that the same teeth will always cut the sides of a groove, and which permits the use of a blade having cross-cut saw teeth for the side cuts and intermediate chipper teeth for forming a flat bottom groove.

A further object of this invention is to provide an adjustable dado cutter in which the parts are always held in position such that any desired setting of the blade can be obtained.

Another object of this invention is the provision of an improved mounting for a rotary dado cutter blade effecting adjustable tilting of the blade relative to its axis of rotation by relative rotation between the blade and a mounting element about the axis of rotation of the blade, and giving a three-point support for the blade which is fixed with respect to the cutting elements on the blade.

A still further object of this invention is the provision of an adjustable mounting for a rotary dado cutter which is simple in operation, may be precisely pre-adjusted by calibrated settings, and is securely and reliably held in adjusted position.

These and other objects and features of the invention will be readily apparent to those skilled in the art from the following specification and the appended drawing, in which.

Figure 1:
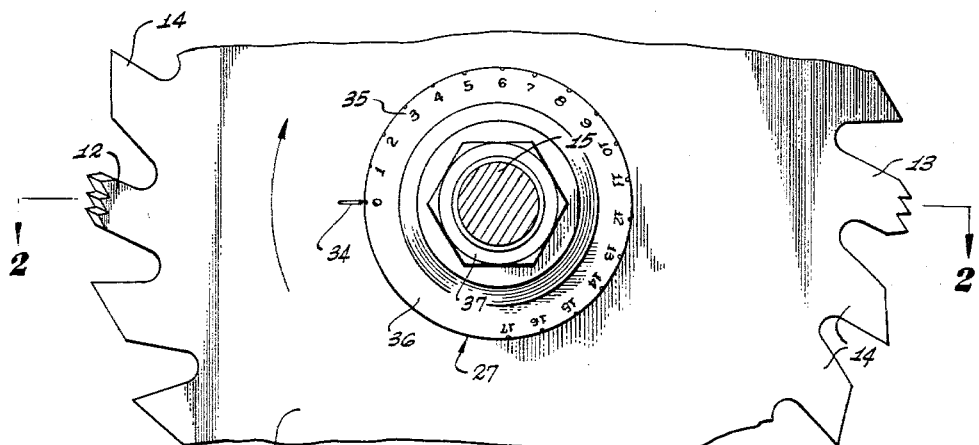
FIGURE 1 is a side elevational view of a dado cutter and mounting therefor according to the present invention.
Figure 2:
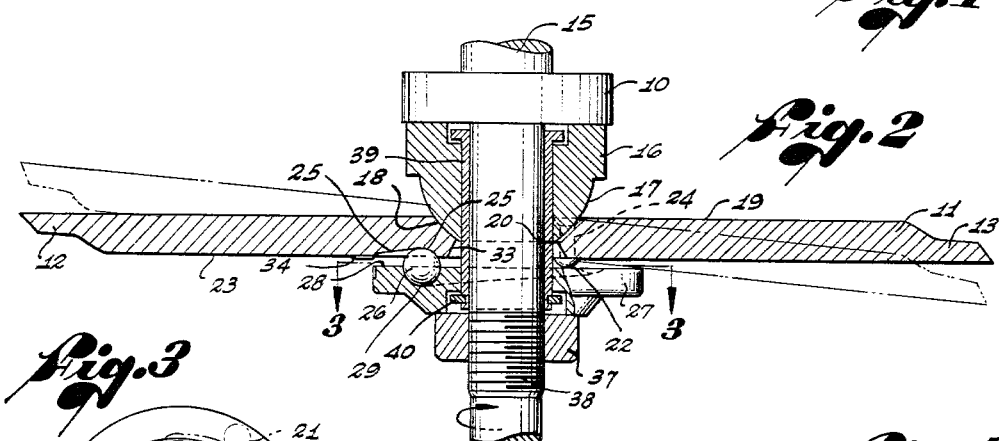
FIGURE 2 is a horizontal sectional view, partly in elevation, taken on the plane including the axis of the drive shaft.
Figure 3:
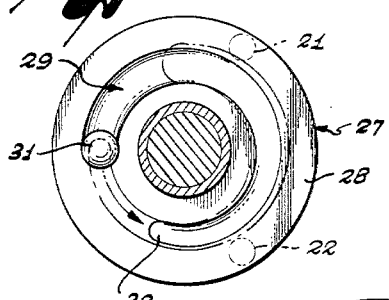
FIGURE 3 is a sectional view on the line 3—3 of FIGURE 2.

Referring first to FIGURES 1 through 3 of the drawing and the exemplification of the invention therein illustrated, the dado cutter blade 11 selected for illustration is substantially circular in form and has a pair of diametrically opposed saw-tooth portions 12 and 13 disposed at the edge thereof. Cutting or chipping teeth 14 are disposed about the periphery of the blade. The supporting and rotating shaft for the blade is shown at 15 having an abutment collar 10 rigidly mounted thereon against movement relative thereto. A dado blade mounting head 16 has an integral rounded projection 17 received within a socket 18 centrally disposed in one face 19 of the blade 11. The projection 17 and the socket 18 provide a ball and socket mounting for one side of the blade 11 and provide for tilting movement of the blade 11 relative to the drive shaft 15.

A central opening 20 is provided through the blade 11 and the drive shaft passes freely therethrough. A pair of rounded supporting projections 21 and 22 project from the face 23 of the blade 11. These projections 21 and 22 are preferably disposed equidistant from the diameter joining the sawtooth portions 12 and 13 and with the line joining the projections disposed at right angles to this diameter, so that tilting of the blade 11 will always dispose the portions 12 and 13 at maximum tilt in opposite directions. The projections 21 and 22 are shown as rounded heads mounted on stems 24 riveted in the blade 11. A short oval socket 25 is disposed in the face 23 of the blade 11 upon the diameter interconnecting the sawtooth portions 12 and 13 and on the opposite side of the shaft 15 from the supporting projections 21, 22. In the socket 25 is disposed a blade-supporting ball 26.

An adjustment head 27 of general disc-like form is disposed on the shaft 15 for free axial and rotative movements relative thereto. In the face 28 of the head 27 which is adjacent the face 23 of the blade 11 there is formed a groove 29 in which the ball 26 is disposed for movement therealong upon relative rotation between the head 27 and the blade 11. The groove 29 is of varying depth, as is seen from an inspection of FIGURES 2 and 3, varying from maximum depth at one end 31 to minimum depth at its other end 32. Therefore, as the head 27 and the blade 11 are relatively rotated, the blade must tilt relative to the drive shaft 15 about the ball and socket mounting 17, 18 to accommodate the ball 26 in varying depths of the groove 29. The central opening 20 is chamfered or countersunk at 33 at the face 23 to provide clearance for the tilting movement of the blade 11.

The face 23 of the blade 11 and the head 27 are preferably provided with calibrated indicia for presetting the amount of tilt of the blade 11, thereby directly determining the width of the dado or groove from the initial setting of the indicia and without the necessity for trial adjustments dictated by the widths of sample grooves. In the exemplification selected for illustration in the drawing, a reference mark is shown at 34 on the surface 23 of the blade 11 and the indicia cooperating therewith are shown at 35 on the face 26 of the head 27.

A nut 37 is threaded upon a portion 38 on the shaft 15 and after the blade 11 has been adjusted to its desired tilted position, tightening of the nut 37 forces the parts together against the abutment collar 10 to rigidly hold the blade 11 against rotation relative to the shaft 15 and with the blade 11 securely held in the tilted position to which it was adjusted. After tightening of the nut 37, the blade 11 is held by the ball and socket mounting 17, 18 on one side and by a three-point support provided by the rounded projections 21, 22 and the ball 26 on the other side.

When removed from the shaft 15, the mounting head 16, blade 11, ball 26 and adjustment head 27 are loosely and releasably held together as a unit by a cylindrical sleeve 39 having a removable snap ring 40 on one end thereof.

To effect adjustment of the tilt of the blade 11 relative to the drive shaft, the parts are brought to rest, the nut 37 is loosened, and the head 27 is rotated relative to the blade 11, or vice versa, until the desired indicia 35 are opposite the indicating blade portions 12 and 13. The nut 37 is then tightened and the dado cutter will cut a dado or groove whose width will correspond to the setting of the indicia 35. It is obvious that the indicia 35 may be directly calibrated in dimensions of the width of the dado or groove to be produced, or may be simply arbitrary numbers with calibration secured through a reference chart. In any event, the arrangement provides for direct pre-setting of the dado cutter for any desired width of dado or groove without trial adjustments and measurements.

By way of example only and without limitation on the scope of the invention, practical dimensions for one form of dado cutter and mounting according to the present invention might be a cutter blade having a diameter of 6 inches and a thickness of 5/16 of an inch, and with a maximum tilt at the sawtooth portions 12, 13 of approximately 3/8 of an inch at each side.

Figure 4:
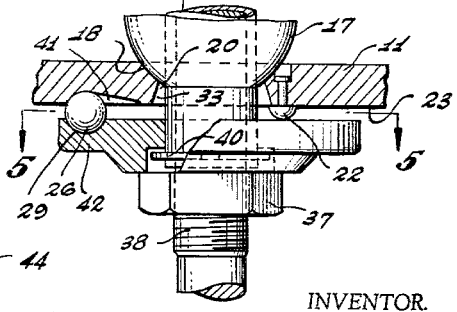
FIGURE 4 is a partial view similar to FIGURE 2, but showing a modified form of the invention, taken on the angularly disposed lines 4—4 of FIGURE 5.
Figure 5:
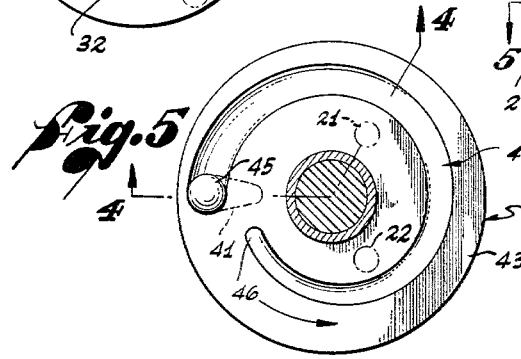
FIGURE 5 is a sectional view on the line 5—5 of FIGURE 4.

In the modification of FIGURES 4 and 5, the blade 11 has the same central opening 20 and the socket 18 cooperating with the rounded head projection 17. The projecting supports 21, 22 may remain the same, as well as their relationship with the sawtooth portions 12 and 13. However, instead of the short oval socket 25, the face 23 of the blade 11 is now provided with a radially extending groove 41 disposed in the diameter connecting the sawtooth portions 12, 13 and preferably of varying depth, with the end of less depth disposed inwardly of the portion of greater depth. For the adjustment head 27 is now substituted an adjustment head 42 in whose surface 43 there is formed a groove 44 in which the ball 26 rides.

The groove 44 is spirally arranged and is preferably of varying depth from its outer deep end 45 to its inward shallow end 46.

In the adjustable mounting of the modification of FIGURES 4 and 5, as the blade 11 and the head 42 are relatively rotated the ball 26 moves along the groove 44 and because of the change in depth of the groove 44, will tilt the blade 11 in the same manner as in the preferred exemplification. However, due to the spiral form of the groove 44, this relative rotation also moves the ball radially inwardly in the groove 41 to effect a greater tilting of the blade 11 from two additional effects: (1) the change in depth of the groove 41, and (2) the movement of the ball 26 relative to the axis of tilt of the blade. In the arrangement shown in FIGURE 4 all three effects are cumulative to produce a greater tilting movement of the blade 11 for a given rotation of the adjustment head. Therefore, as the blade 11 and the adjustment head 42 rotate relative to each other, the blade is tilted from the summation of effects (1) change in depth of the groove 44, (2) change in depth of the groove 41, and (3) the change in the spacing between the ball 26 and the axis of tilt of the balde 11. It will be understood that either or both of the grooves 41 and 44 may be of constant depth within the spirit of the invention.

It will thus be seen that the present invention provides a simple and reliable adjustment of the width of a dado or groove from the adjustable tiltable mounting of the dado cutter blade on its drive shaft. The adjustment provides for three-point support at one side of the blade and insures that the tilting axis is always at right angles to the diameter joining the opposed sawtooth portions of the blade. These portions will thereby always be disposed at maximum tilt for all adjustments of the blade, to cut the boundaries of the dado. The adjustable mounting requires no substitution or addition of parts and no special tools and, in fact, only manual manipulation after the mounting nut has been loosened. The adjustment further provides for accurate pre-setting of the width of the dado to be cut by calibrated indicia and does away with trial and measured adjustments.

While certain presently preferred embodiments of the invention have been selected for specific illustration and description herein, it will be understood that the invention is not limited thereto, as many variations will be apparent to those skilled in the art, and the invention is to be given its broadest interpretation within the terms of the following claims.

I claim:

1. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively movable to effect movement of the ball in the groove, said groove being of varying depth to vary the spacing between said adjacent faces and the tilt of the blade on the shaft; and means for forcing said tool parts together axially of the shaft to hold the blade firmly in adjusted tilted position against rotation relative to the shaft and preventing relative movement between the blade and the adjustment head.

2. An adjustable dado cutting tool mountable upon a rotatable drive shaft comprising: a substantially circular cutting blade having a central opening therethrough for the reception of a drive shaft passing therethrough; saw teeth on diametrically opposite peripheral edge portion of the blade; chipping teeth at peripheral edge portions of the blade intermediate said saw teeth portions; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively movable to effect movement of the ball in the groove, said groove being of varying depth to vary the spacing between said adjacent faces and the tilt of the blade on the shaft; and means for forcing said tool parts together axially of the shaft to hold the blade firmly in adjusted tilted position against rotation relative to the shaft and preventing relative movement between the blade and the adjustment head.

3. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively rotatable to effect movement of the ball in the groove, said groove being of varying depth to vary the spacing between said adjacent faces and the tilt of the blade on the shaft; means for forcing said tool parts together axially of the shaft to hold the blade firmly in adjusted tilted position against rotation relative to the shaft and preventing relative rotation between the blade and the adjustment head, said groove forming a substantially circular curve about the axis of said shaft receiving opening and said ball being mounted in a socket in the adjacent face opposite the one carrying the groove.

4. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively movable to effect movement of the ball in the groove, said groove being of varying depth to vary the spacing between said adjacent faces and the tilt of the blade on the shaft; means for forcing said tool parts together axially of the shaft to hold the blade firmly in adjusted tilted positon against rotation relative to the shaft and preventing relative movement between the blade and the adjustment head, said groove forming a spiral curve about the axis of said shaft receiving opening with the inner end of the groove being of lesser depth than the outer end of said groove; and a groove in said other face also receiving said ball, said last mentioned groove extending radially of said shaft axis.

5. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively movable to effect movement of the ball in the groove, said groove being of varying depth to vary the spacing between said adjacent faces and the tilt of the blade on the shaft; means for forcing said tool parts together axially of the shaft to hold the blade firmly in adjusted tilted position against rotation relative to the shaft and preventing relative movement between the blade and the adjustment head, said groove forming a spiral curve about the axis of said shaft receiving opening with the inner end of said groove being of lesser depth than the outer end of said groove; and a groove in said other face also receiving said ball, said last mentioned groove extending radially and being of varying depth with its inner end of lesser depth than its outer end.

6. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening said last mentioned means comprising an elongated groove disposed in one of said faces and a ball in said groove and engaging in the other of the faces, said blade and adjustment head being relatively rotatable to effect movement of the ball in the groove and said groove being of varying depth to vary the spacing between said adjacent faces and the tilt of the blade on the shaft; means for forcing said tool parts together axially of the shaft to hold the blade firmly in adjusted titlted position against rotation relative to the shaft and preventing relative rotation between the blade and the adjustment head; and indicia indicating means on at least one of said blade and adjustment head providing for calibrated presetting adjustment of the blade tilt and dado width.

7. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; a mounting head disposable in relatively fixed position on said shaft at one side of said blade; a substantially ball and socket connection between said head and blade providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively rotatable to effect movement of the ball in the groove, and said groove being of varying depth to vary the spacing between said adjacent faces and the tilt of the blade on the shaft; and means for forcing said tool parts together axially of the shaft to hold the blade firmly in adjusted tilted position against rotation relative to the shaft and preventing relative rotation between the blade and the adjustment head.

8. An adjustable dado cutting tool mountable upon a rotatable drive shaft comprising: a cutting blade having a central opening therethrough for the reception of a drive shaft passing therethrough; cutting teeth on diametrically opposite edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade, said bearing points being spaced on opposite sides of the diameter connecting said cutting teeth with the line connecting them at right angles to said diameter; means for varying the spacing between said adjacent blade and adjustment head faces at the opposite side of such shaft receiving opening, said last mentioned means comprising an elongated groove disposed in one of said faces and a ball in said groove and engaging in the other of the faces, so as to be always located on said diameter, said blade and adjustment head being relatively movable to effect movement of the ball in the groove, said groove being of varying depth to vary the spacing between said adjacent faces and the tilt of the blade on the shaft; and means for forcing said tool parts together axially of the shaft to hold the blade firmly in adjusted tilted position against rotation relative to the shaft and preventing relative movement between the blade and the adjustment head.

9. An adjustable dado cutting tool mountable upon a rotatable drive shaft comprising: a cutting blade having a central opening therethrough for the reception of a drive shaft passing therethrough; cutting teeth on diametrically opposite peripheral edge portions of the blade; means mountable on the drive shaft and engaging the blade at one side thereof for supporting the blade on the shaft, said means providing for tilting of the blade to adjusted positions relative to the shaft to determine the width of the dado to be cut; an adjustment head mountable on said shaft at the opposite side of said blade; means providing a pair of bearing points between adjacent faces of said blade and adjustment head at one side of said shaft opening in the blade; means for varying the spacing between said adjacent blade and adjustment head faces at the opposite side of such shaft receiving opening, said last mentioned means comprising an elongated groove disposed in one of said faces and a ball in said groove and engaging in the other of the faces, said blade and adjustment head being relatively movable to effect movement of the ball in the groove, said groove being of varying depth to vary the spacing between said adjacent faces and the tilt of the blade on the shaft; means for forcing said tool parts together axially of the shaft to hold the blade firmly in adjusted tilted position against rotation relative to the shaft and preventing relative movement between the blade and the adjustment head; and a sleeve extending between the blade supporting means on the one side of the blade and the adjustment head on the opposite side of the blade through the central opening in the blade for releasably holding said cutting tool parts together when disassembled from the drive shaft.

References Cited by the Examiner

UNITED STATES PATENTS

| | | | |
|---|---|---|---|
| 292,316 | 1/1884 | Johnson | 144—238 |
| 706,770 | 8/1902 | Miller | 144—238 |

DONALD R. SCHRAN, *Primary Examiner.*